(12) United States Patent
Villatel et al.

(10) Patent No.: US 10,275,367 B2
(45) Date of Patent: Apr. 30, 2019

(54) COMMAND SOURCE VERIFICATION

(71) Applicant: Hewlett-Packard Development Company, L.P., Houston, TX (US)

(72) Inventors: Maugan Villatel, Bristol (GB); Richard A. Bramley, Jr., Mansfield, MA (US); Valiuddin Y. Ali, Cypress, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 99 days.

(21) Appl. No.: 15/495,902

(22) Filed: Apr. 24, 2017

(65) Prior Publication Data
US 2018/0307629 A1 Oct. 25, 2018

(51) Int. Cl.
| | | |
|---|---|---|
| G06F 12/14 | (2006.01) |
| G06F 13/16 | (2006.01) |
| G06F 3/06 | (2006.01) |
| G06F 9/4401 | (2018.01) |

(52) U.S. Cl.
CPC .......... *G06F 12/1491* (2013.01); *G06F 3/065* (2013.01); *G06F 3/0619* (2013.01); *G06F 3/0622* (2013.01); *G06F 3/0659* (2013.01); *G06F 3/0685* (2013.01); *G06F 9/4401* (2013.01); *G06F 13/1663* (2013.01); *G06F 2212/1052* (2013.01)

(58) Field of Classification Search
CPC ............ G06F 12/1491; G06F 9/4401; G06F 13/1663; G06F 3/0622; G06F 3/0659; G06F 3/0619; G06F 3/065; G06F 3/0685; G06F 2212/1052
See application file for complete search history.

(56) References Cited

U.S. PATENT DOCUMENTS

| | | | |
|---|---|---|---|
| 9,418,223 B2 | 8/2016 | Page et al. | |
| 2005/0289311 A1 | 12/2005 | Durham et al. | |
| 2008/0069011 A1* | 3/2008 | Sekaran | H04L 12/1813 370/260 |
| 2012/0066499 A1* | 3/2012 | Ali | G06F 21/305 713/170 |
| 2014/0365624 A1* | 12/2014 | Whittemore | H04L 41/0806 709/221 |
| 2015/0302200 A1 | 10/2015 | Tonry et al. | |
| 2017/0243408 A1* | 8/2017 | Lei | G08C 17/02 |

OTHER PUBLICATIONS

Land, Joel, "Vulnerability Note VU#631788" revised Jul. 8, 2015, 3 pages.
Yao, Jiewen, et al., "A Tour Beyond BIOS Secure SMM Communication in the UEFI Developer Kit II", Intel Corporation, Jun. 2015, 29 pages.

* cited by examiner

*Primary Examiner* — Hiep T Nguyen
(74) *Attorney, Agent, or Firm* — Brooks, Cameron & Huebsch (57) ABSTRACT

Example implementations relate to command source verification. An example device can include instructions executable to send a command via a predefined path to a predefined location within a memory resource storing instructions executable to verify a source of the command using a predefined protocol and execute the command in response to the source verification.

15 Claims, 4 Drawing Sheets

COMMAND SOURCE VERIFICATION

BACKGROUND

A privilege level can control access of a program currently running on a processor to resources such as memory regions, input/output (I/O) ports, and special instructions. A highest ranking privilege mode, such as system management mode (SMM) can include an operating mode in which normal execution, including the operating system, is suspended.

DETAILED DESCRIPTION

Processors can have execution privilege concepts. For instance, execution privileges in an x86 architecture can include rings, virtualization extensions, and/or SMM, among others. Execution privilege examples in Advanced RISC Machine (ARM) include exception levels and/or privilege levels, and TrustZone, among others. Such execution privilege examples can include approaches for partitioning a memory resource such that lower-privileged code cannot access an area of higher privileged memory.

A processor may communicate at runtime with an external entity, for instance another device or a co-processor, among others. The external entity being outside the scope of the any execution privilege/execution levels defined, may have unrestricted access to the memory resources associated with the processor. The external entity, in some examples, can access the system's main memory without restriction, but may have a limited ability to receive notification that there is a command to process and/or to determine where to look in the system's main memory for the command. In such an example, communication approaches include filling a buffer in a memory resource with a command and various parameters and telling the external entity an address of the buffer on which to operate. The external entity can read the command and write its output and status into the buffer. However, in such approaches, the external entity may not know from what privilege level the command came, which can lead to security concerns where lower privileged code can cause the external entity to act on a memory resource that would normally only be accessible to higher privileged code.

For instance, in an x86 architecture, lower privileged code in the operating system (OS) can instruct the external entity to operate on an address belonging to a memory resource associated with highly privileged code (e.g., system management random-access memory (SMRAM on an x86 architecture). This can lead to the device reading and processing data at that address, and then writing back some output data and status code in that same buffer in SMRAM. This may lead to information leakage and/or memory corruption, which can in turn lead to privilege escalation (e.g., the OS compromising SMM). In other approaches, it may be desired for the external entity to validate whether a particular command was sent from SMM (e.g., to restrict access to a given command to SMM only). However, a naïve approach such as checking if the address of the buffer is within SMRAM may not work. As such, the OS can tell the external entity to operate on any address within SMRAM. If a malicious OS desires to fully control the content of the buffer, it can use an existing application programming interface (API) to cause data to be copied from OS memory to SMRAM and give the address of where the data has been copied, causing security issues.

In contrast, some examples of the present disclosure can prevent malicious code outside of a highly privileged memory mode (e.g., SMM) from convincing an external entity that a command came from the highly privileged memory mode when it did not. Similar, some examples of the present disclosure can prevent malicious code outside of a highly privileged memory mode from causing an external entity to write into system memory (e.g., SMRAM) at random locations in an attempt to create a vulnerability. For instance, examples of the present disclosure can allow for an external entity to determine from where a command is coming, and for the source of the command to send the command via a particular predefined path, allowing the external entity to verify the source. As used herein, a particular predefined path can include a plurality of components associated with sending a command. For instance, a particular predefined path can include a particular sequence (including set up), as will be discussed further herein with respect to FIG. 1, among others.

Figure 1:
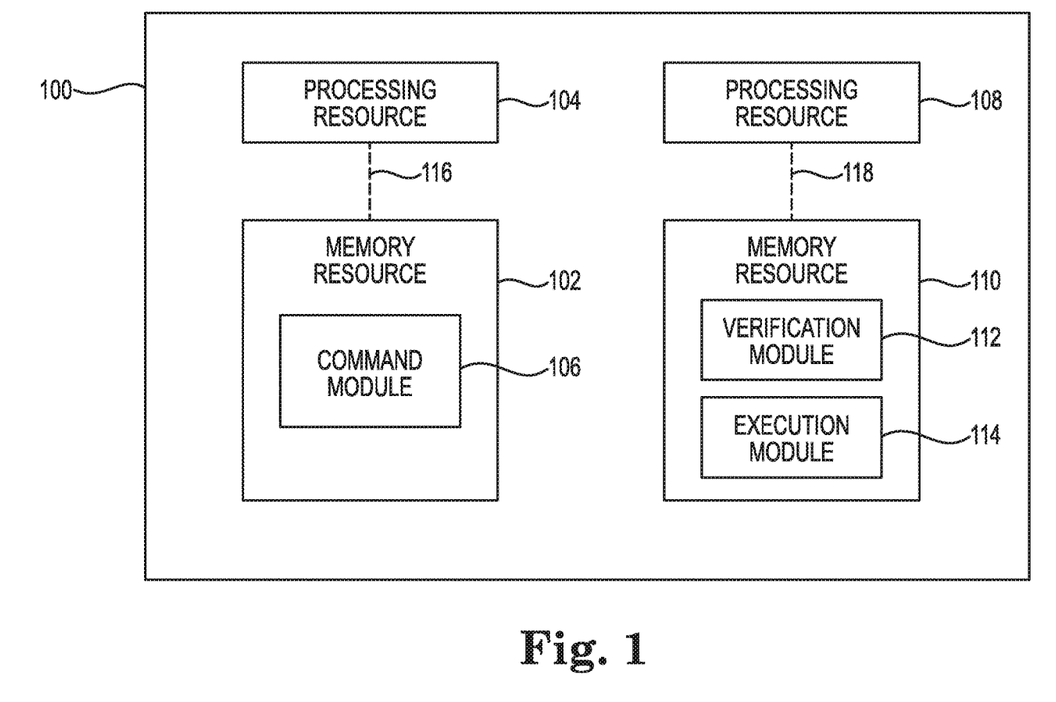
FIG. 1 illustrates a diagram of a device including processing resources, memory resources, and a number of modules according to an example.

FIG. 1 illustrates a diagram of a device 100 including processing resources 104 and 108, memory resources 102 and 110, and a number of modules 106, 112, and 114 according to an example. In some examples, device 100 can be a computing system. The device 100 can utilize instructions (e.g., software and/or firmware) hardware, and/or logic to perform a number of functions including those described herein. The device 100 can be a combination of hardware and program instructions configured to share information. The hardware, for example, can include processing resources 104 and/or 108 and/or memory resources 102 and/or 110 (e.g., computer readable medium (CRM), machine readable medium (MRM), etc., database, etc.).

Processing resources 104 and/or 108, as used herein, can include a processor capable of executing instructions stored by memory resources 102 and/or 110. Processing resources 104 and/or 108 can be implemented in a single device or distributed across multiple devices. The program instructions (e.g., machine-readable instructions (MRI)) can include instructions stored on the memory resources 102 and/or 110 and executable by the processing resources 104 and/or 108 to implement a desired function (e.g., command source verification).

The memory resource 102 can be in communication with a processing resource 104. The memory resource 110 can be in communication with a processing resource 108. Memory resources 102 and/or 110, as used herein, can include memory components capable of storing instructions that can be executed by processing resources 104 and/or 108. Such memory resources 102 and/or 110 can be a non-transitory CRM or MRM. Memory resources 102 and/or 110 can be integrated in a single device or distributed across multiple devices. Further, memory resources 102 and/or 110 can be fully or partially integrated in the same device as processing resources 102 and/or 108 or can be separate but accessible to that device and processing resources 102 and/or 108.

Thus, it is noted that the device 100 can be implemented on a participant device, on a server device, on a collection of server devices, and/or a combination of the user device and the server device.

The memory resource 102 can be in communication with the processing resource 104 via a communication link (e.g., a path) 116, and the memory resource 110 can be in communication with the processing resource 108 via a communication link 118. The communication links 116 and/or 118 can be local or remote to a machine (e.g., a computing system) associated with the processing resources 102 and/or 108. Examples of a local communication links 116 and/or 118 can include an electronic bus internal to a machine (e.g., a computing system) where the memory resources 102 and/or 110 are volatile, non-volatile, fixed, and/or removable storage medium in communication with the processing resources 104 and/or 108 via the electronic busses.

In some examples, processing resource 104 and processing resource 108 can run in parallel. Memory resource 102 can be associated with a highest privilege mode available on the device. For instance, memory resource 102 can be associated with an SMM (e.g., in x86 architecture) or privileged mode (e.g., in ARM architecture), among others. For example, memory resource 102 and/or a particular block of memory associated with memory resource 102 can be associated with the highest privilege mode. As used herein, "associated with a highest privilege mode" and "associated with a highly privilege mode" can refer to a device reserved to a highest or highly privileged memory mode and/or having a portion of memory that can be accessed only while the device is executing in the highest or highly privileged memory mode (e.g., SMM, privileged mode, etc.).

A module and/or modules 106, 112, and/or 114 can include MRI that when executed by the processing resources 104 and/or 108 can perform a number of functions including those described herein. The number of modules 106, 112, and/or 114 can be sub-modules of other modules. For example, the execution module 114 can be a sub-module of the verification module 112, among other module-sub-module combinations. In another example, the number of modules 106, 112, and/or 114 can comprise individual modules at separate and distinct locations (e.g., MRM, etc.).

Each of the number of modules 106, 112, and/or 114 can include instructions that when executed by the processing resources 104 and/or 108 can function as a corresponding engine. For example, the command module 106 can include instructions that when executed by the processing resource 104 can function as a command engine. Similar, the verification module 112 and the execution module 114 can include instructions that when executed by the processing resource 108 can function as verification and execution engines, respectively.

In some examples, engines can be part of a system (not illustrated in FIG. 1) including a database, a subsystem, and the number of engines. The subsystem can include the number of engines in communication with the database via a communication link. The system can represent instructions and/or hardware of a network controller. The number of engines can include a combination of hardware and programming to perform functions including those described herein. The instructions can include instructions (e.g., software, firmware, etc.) stored in a memory resource (e.g., CRM, MRM, etc.) as well as hard-wired program (e.g., logic).

In some instances, command module 106 can include instructions that when executed by the processing resource 104 can send a command to processing resource 108 via a predefined path (e.g., sequence) to a predefined location within memory resource 102. Processing resource 104 and/or memory resource 102, in some instances, can be a device associated with a highly privileged mode such as SMM or privileged mode, as discussed further herein. In some examples, processing resource 108 can be an external entity and/or can be a secure processor, such as a platform security processor (PSP), among other types of secure processors.

In some examples, information can be sent to processing resource 108 during boot including, for instance, including an address of a privileged predefined location in memory resource 102. In such an example, if an unprivileged (or lower privileged) device attempts to tell the processing resource 108 to process a command in memory location 102 but outside of the predefined memory location, the processing resource 108 can default refuse because it is not the specified location agreed to at boot time. In some instances, a device associated with a highly privileged mode may not be able to tell the processing resource 108 to process a command outside of the predefined memory location once the predefined memory location is set. Put another way, a predefined location in memory resource 102 can exist such that processing resource 108 can modify and/or read/write data to and/or from that predefined location, but other locations may be refused and assumed to be an OS or other source instructing the processing resource 108 to corrupt a privileged memory resource (e.g., memory resource 102).

In such an example, the predefined path can include an agreed-upon protocol between the device sending the command and processing resource 108 receiving the command. For instance, the predefined path may include filling a command buffer and determining flag values in a specific order, among other protocols. If every factor in the predefined path is not met in the correct order, the command may not be executed. For instance, verification module 112 can include instructions that when executed by the processing resource 108 can cause a device to verify, using the predefined path, that a source of the command is processing resource 104. In some examples, verifying can include verifying a security privilege level of memory resource 102.

A predefined path can include, in some examples, a processing resource (e.g., processing resource 104) executing instructions to write a command to a command buffer into memory (e.g., SMRAM). The processing resource can write to a number of mailbox registers that can hold limited information. For instance, information that does not fit in a mailbox register may be what is written to the command buffer. In some examples, the number of mailbox registers may store an address of the command buffer and a command identification. In such an example, writing to the registers can wake another processing resource (e.g., processing resource 108), which can execute instructions to read the content of the registers to determine the command identification and the location of the command buffer. In response, the processing resource can execute instructions to read the buffer, process the command, and write a response to the command and/or write the result. For instance, processing resource 108 can verify that a command it receives is coming from a device associated with a highly privileged mode and is a command that can be sent only from a device associated with a highly privileged mode. The predefined protocol can in some examples be the same as the predefined path followed by the command. In other instances, the predefined protocol may be an agreed-up protocol for approval or denial of the command by processing resource 108. This can include, in some instances, a handshake between the device associated with the highly privileged mode and processing resource 108.

Execution module 114 can include instructions that when executed by the processing resource 108 can cause a device to execute the command in response to the source verification. Put another way, in response to the command being sent via the predefined path and verification of the source of the command being from a device in the highly privileged mode, the command can be executed.

An example of a command can include a command for the processing resource receiving the command to shut down. The command can come from a device associated with a highly privileged mode, and the command can come from a particular part of a memory resource within that device in some instance (e.g., as part of the predefined path and/or protocol). The processing resource receiving the command can verify the source and shut down accordingly.

In some examples, processing resource 104 and processing resource 108 can run in parallel. For instance, processing resource 104 can be a first device and processing resource 108 can be a platform security processor running in parallel to processing resource 104 as it provides services for other components of device 100. As noted above, memory resource 102 can be associated with a highest privilege mode available on the device. For instance, memory resource 102 can be associated with an SMM (e.g., in x86 architecture) or privileged mode (e.g., in ARM architecture), among others.

Figure 2:
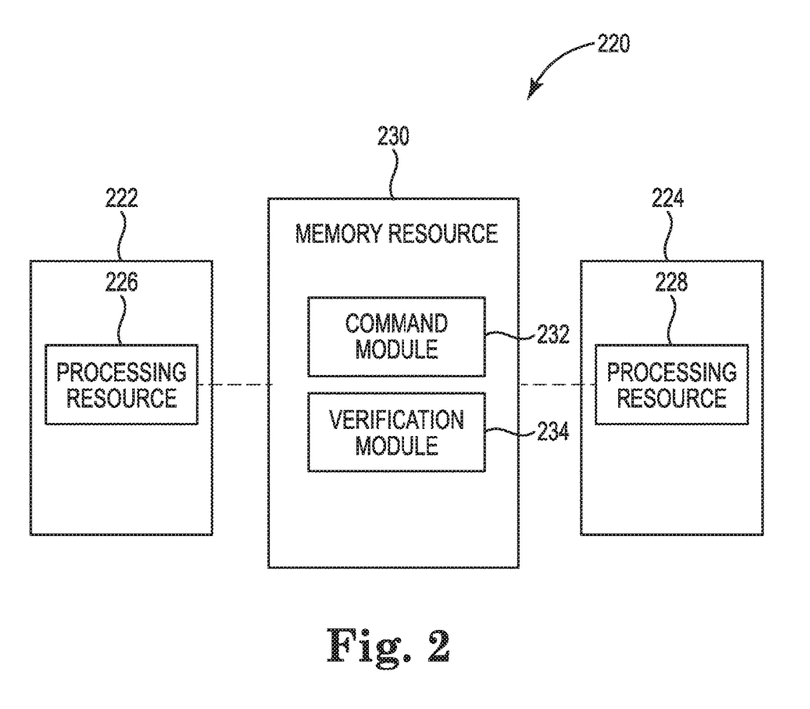
FIG. 2 illustrates a diagram of a computing system including devices processing resources, a memory resource, and a number of modules according to an example.

FIG. 2 illustrates a diagram of a computing system 220 including devices 222 and 224, processing resources 226 and 228, a memory resource 230, and a number of modules 232 and 234 according to an example. The computing system 220 can utilize instructions (e.g., software and/or firmware) hardware, and/or logic to perform a number of functions including those described herein. The device 220 can be a combination of hardware and program instructions configured to share information. The hardware, for example, can include a processing resource 226 and/or 228 and/or a memory resource 230 (e.g., CRM, MRM, etc., database, etc.). In some examples, memory resource 230 can be shared between processing resources 226 and 228 and/or between devices 222 and 224, and in some examples can be a memory resource associated with highly privileged code (e.g., SMRAM). In some examples, device 222 can be a device sending command instructions, and device 224 can be a device receiving command instructions. Device 222 can be communicatively coupled to device 224. As used herein, communicatively coupled can include coupled via various wired and/or wireless connections between devices such that data can be transferred in various directions between the devices.

Processing resources 226 and/or 228, as used herein, can include a processor capable of executing instructions stored by memory resource 230. Processing resources 222 and/or 228 can be implemented in a single device or distributed across multiple devices. The program instructions (e.g., MRI) can include instructions stored on the memory resource 230 and executable by the processing resources 226 and/or 228 to implement a desired function (e.g., command source verification).

The memory resource 230 can be in communication with processing resources 226 and/or 228. Memory resource 230, as used herein, can include memory components capable of storing instructions that can be executed by processing resources 226 and/or 228. Such memory resource 230 can be a non-transitory CRM or MRM. Memory resource 230 can be integrated in a single device or distributed across multiple devices. Further, memory resource 230 can be fully or partially integrated in the same device as processing resources 226 and/or 228 or can be separate but accessible to that device and processing resources 226 and/or 228. Thus, it is noted that the computing system 220 can be implemented on a participant device, on a server device, on a collection of server devices, and/or a combination of the user device and the server device.

The memory resource 230 can be in communication with the processing resources 226 and/or 228 via communication links, and the communication links can be local or remote to a machine (e.g., a computing system) associated with the processing resources 226 and/or 228.

A module and/or modules 232 and/or 234 can include MRI that when executed by the processing resource 226 can perform a number of functions including those described herein. In some instances, the MRI can be executed by processing resource 228. The number of modules 232 and/or 234 can be sub-modules of other modules. For example, the command module 232 can be a sub-module of the verification module 234, among other module-sub-module combinations. In another example, the number of modules 232 and/or 234 can comprise individual modules at separate and distinct locations (e.g., MRM, etc.).

Each of the number of modules 232 and/or 234 can include instructions that when executed by the processing resource 226 can function as a corresponding engine. For example, the command module 232 can include instructions that when executed by the processing resource 226 can function as a command engine. Similar, the verification module 234 can include instructions that when executed by the processing resource 226 can function as a verification engine.

In some examples, engines can be part of a system (not illustrated in FIG. 2) including a database, a subsystem, and the number of engines. The subsystem can include the number of engines in communication with the database via a communication link. The system can represent instructions and/or hardware of a network controller. The number of engines can include a combination of hardware and programming to perform functions including those described herein. The instructions can include instructions (e.g., software, firmware, etc.) stored in a memory resource (e.g., CRM, MRM, etc.) as well as hard-wired program (e.g., logic).

In some examples, the number of modules 232 and/or 234 can be used in a software-as-a-service delivery model. For instance, components of computing system 220 can exist in a single computing system or multiple computing systems (e.g., distributed). For example, a web server or other computing system that is trusted by the user can provide services to a server of individual data streams, and/or act on behalf of the user as a processing agent for recovery.

In an example, command module 232 can include instructions that when executed by the processing resource 226 can cause a computing system to send a command to device 224 via a predefined path by filling a predefined command buffer in memory resource 230, and setting a flag located in shared memory resource 230 to a particular non-zero value. In some examples the flag can be a Boolean flag, and in some examples, the particular non-zero value can be a value that matches a flag identification of the command. Matching flags may allow for authenticating more than one command coming from a device associated with a highly privileged mode.

In an example, verification module 234 can include instructions that when executed by the processing resource 226 can cause a computing system to verify a source of the command by determining whether the command buffer overlaps with shared memory resource 230. For instance, physical memory can be continuous, and a portion of it can be reserved to shared memory resource 230. Overlapping can include detecting as malicious a start of a buffer in physical memory that ends in shared memory resource 230 (e.g., SMRAM); a start of a buffer in shared memory resource 230 ending in OS memory; a start of a buffer in OS memory ending in OS memory, but including a whole of shared memory resource 230; and/or an entire buffer in shared memory resource 230, but not in a predefined memory location.

In response to a determination that the command buffer does overlap with shared memory resource 230, a determination can be made whether the flag has the particular value (e.g., a correct value). In response to a determination that the flag does have the particular value, the command can be executed.

In some examples, verifying the source of the command can include verifying the source of the command by exiting processing of the command in response to a determination that the flag does not have a particular value and/or in response to a determination that the command buffer does not overlap with shared memory resource 230. For example, these may be deviations from the predefined path, and in response, the command may not be executed, as the source of the command cannot be verified.

In some examples, as part of the predefined path, computing system 220 can include a basic input/output system (BIOS) comprising instructions stored on shared memory resource 230 and executable by processing resource 226 to pass an address in shared memory resource 230 of the predefined command buffer and/or the flag to device 224 prior to untrusted code being able to execute (e.g., during a system boot). A device (e.g., an external entity), in some examples may only accept these addresses once per secure boot in accordance with the predefined path.

Figure 3:
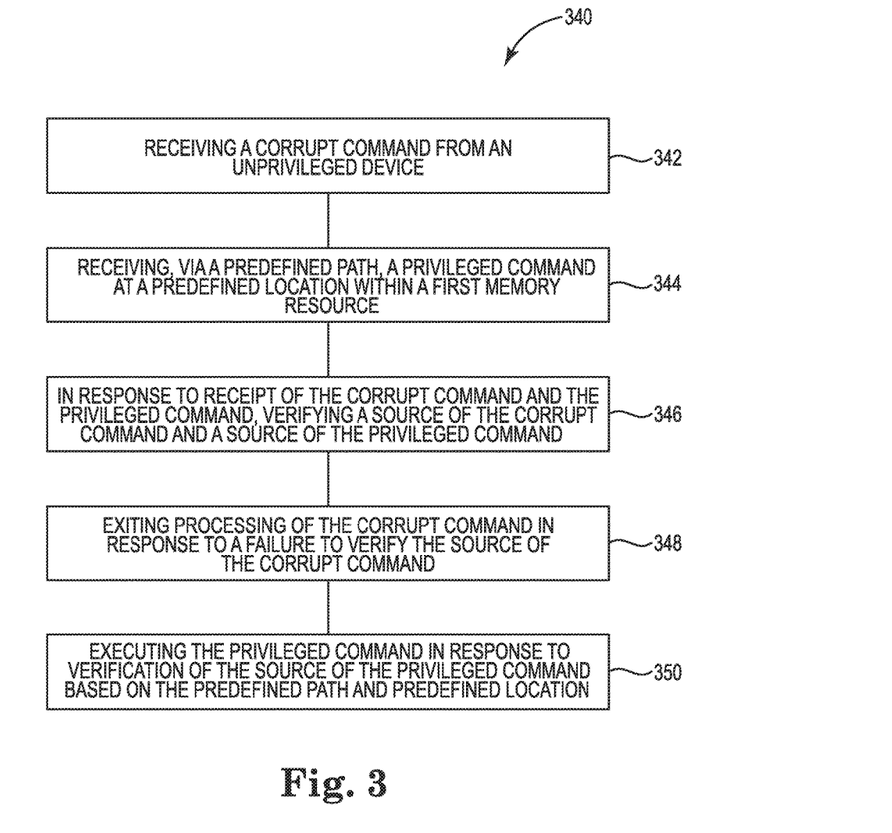
FIG. 3 illustrates a diagram of a method for command source verification according to an example.

FIG. 3 illustrates a diagram of a method 340 for command source verification according to an example. At 342, method 340 can include receiving a corrupt command from an unprivileged device. In some examples, receiving the corrupt command from the unprivileged device comprises receiving the corrupt command from a device associated with a lower security privilege mode than the source of the privileged command. For instance, an OS may attempt to send a command via an external entity to corrupt a device associated with a highly privileged mode. At the time of receipt, it may not be known that the command is corrupt. As will be discussed further herein the corrupt status of the command can be determined subsequent to receipt of the command.

At 344, method 340 can include receiving, via a predefined path, a privileged command at a predefined location within a first memory resource. In such an example, a command can come from a device associated with a highly privileged mode and can follow the predefined path. The command can arrive at a predefined location within the first memory resource, per a predefined protocol (including the predefined path and predefined location) agreed upon at boot by the first memory resource and the source (e.g., the device associated with a highly privileged mode) and a device receiving the command at the predefined location. At the time of receipt, it may not be known that the command is privileged. As will be discussed further herein the privileged status of the command can be determined subsequent to receipt of the command.

Method 340, at 346, can include verifying a source of the corrupt command and a source of the privileged command in response to receipt of the corrupt command and the privileged command. For example, by verifying that the corrupt command did not follow the predefined path and did not arrive at the predefined location, the device receiving the corrupt command determines the command and its source are corrupt. In contrast, by verify that the privileged command followed the predefined path and arrived at the predefined location (with a proper privilege level), the device receiving the command can verify the source is legitimate.

At 348, method 340 can include exiting processing of the corrupt command in response to a failure to verify the source of the corrupt command. Because the command source is unverified (e.g., corrupt), the device receiving the corrupt command knows not to execute the corrupt command. In some examples, exiting processing can include refraining from reading and writing instructions to a buffer associated with the first and the second memory resources. This can prevent further corruption, for instance.

At 350, method 340 can include executing the privileged command in response to verification of the source of the privileged command based on the predefined path and predefined location. For instance, because the device receiving the privileged command verified the source via the predefined protocol, it knows the command is safe to execute.

Figure 4:
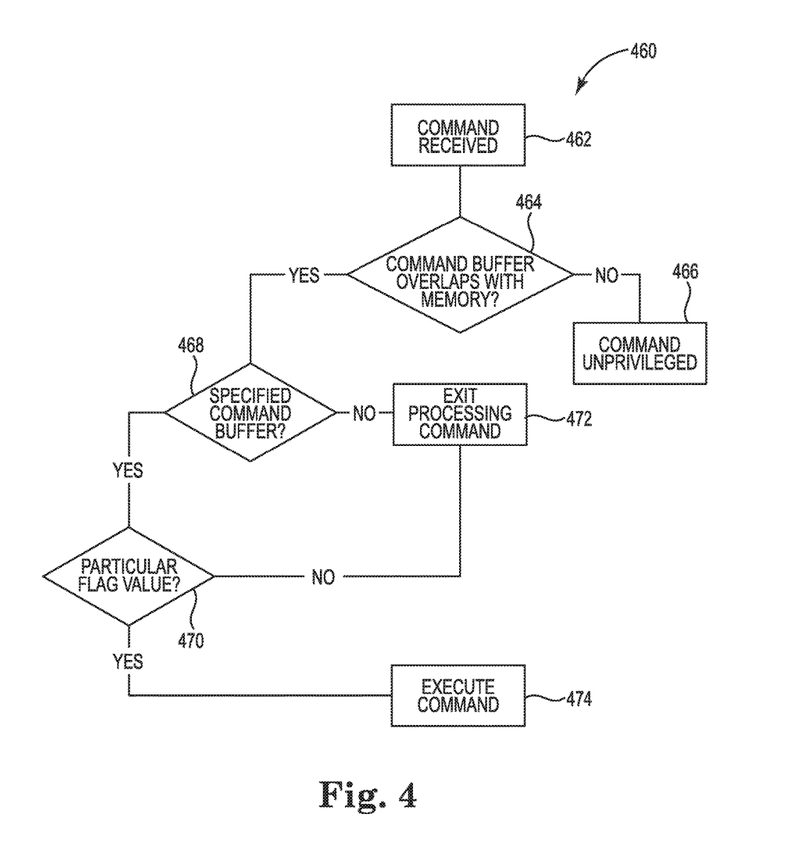
FIG. 4 illustrates a diagram of another method for command source verification according to an example.

FIG. 4 illustrates a diagram of another method 460 for command source verification according to an example. At 462 a command is received. For instance, during boot, a BIOS can pass an address of a predefined command buffer in a memory resource such as SMRAM to an external entity. At the same time, the BIOS can pass an address of a flag also located in the memory resource. In some examples, the external entity may accept these addresses once per boot.

When a device (or a memory resource of the device) associated with a highly privileged mode, such as SMM, prepares to send a command to the external entity, it can fill the command buffer and subsequently set the flag to a particular value (e.g., a value that matches a command identification sent). The external entity can receive the command and while determining whether to process the command, the external entity at 464 can determine if the command buffer overlaps with the memory resource. If it does not overlap, the external entity can treat and/or process the command as unprivileged at 466.

If, at 464, it is determined the command buffer does overlap with the memory resource, the external entity can determine at 486 if it is a specified command buffer. For instance, a specified command buffer can be a command buffer agreed to at boot time. If it is determined not to be a specified command buffer, the external entity with exit processing the command at 472. Exiting processing can include refraining from reading and/or writing anything to the command buffer, as it may be assumed the mismatched address is erroneous and/or malicious.

If, at 468, it is determined it is the specified command buffer, the external entity can determine if the flag value has a particular value (e.g., a particular non-zero value, a correct value, etc.) at 470. If the flag does not have a particular value, the external entity can exit processing the command at 472 without reading and/or writing anything to the command buffer. If the flag value is the particular value, the command can be executed at 474. Because the flag is in the highly-privileged memory resource which may not be writeable by lower privileged code, the external entity believes it was written by code associated with a highly privileged mode (e.g., SMM). Accordingly, the command is sent from a device associated with a highly privileged mode. In some examples, this can prevent code outside of the highly privileged mode from passing addresses of memory associated with the highly privileged mode to an API until it finds the correct address.

For instance, in some examples, the contents of the command buffer may not be specified, but undesirable instances where it is not possible for the external entity to verify a validity of the command buffer may be avoided. Additionally or alternatively, in some examples, use of the command buffer can be prevented until the command-sending device wants it to be used. For instance, filling the command buffer can be a multi-part process in which it may be undesirable for malware to trigger a system management interrupt (SMI) before the command buffer is full.

In some examples, ordering of any reading and/or writing of the flag and/or command buffer can be performed in a particular order (e.g., predefined path, predefined protocol) to avoid race conditions that can be exploited by a malicious OS attempting to persuade the external entity to read stale and/or incomplete data in the command buffer. In some instance, the particular order can include cache flushing if a host processor (e.g., first device) and the external entity (e.g., second device) are not cache-coherent.

In some examples, having a well-defined relationship between the particular flag value and the command identification being sent (e.g., they are equal rather than the flag being just a Boolean), can counter a race condition that can cause the extremal device to believe a command originated from a device associated with a highly privileged mode (e.g., SMM) when it did not. As used herein, well-defined can include having clearly distinguishable limits, boundaries, or features and/or being clearly stated or described. For instance, a well-defined relationship can include the particular value comprising a value that matches an identification of the command. For example, if the external entity runs slower than a host processor, an OS can signal the external entity that a first command is ready to be processed, giving as a command buffer the buffer in the highly privileged memory resource, and immediately after triggering an SMI that may result in the device associated with the highly privileged mode legitimately sending a second command to the external entity. The host processor being faster can fill in the command buffer with the correct parameters, set the flag, and signal the external device that the command is available. In the meantime, the external entity may have just started processing the first command and can check the value of the flag (e.g., which may be at one), thus incorrectly thinking the device associated with the highly privileged mode wanted to send the first command. Additionally, the external entity may interpret the command buffer as parameters for the first command (whereas it was set up by the device associated with the highly privileged mode as parameters to the second command), which may result in security vulnerabilities.

In some examples of the present disclosure, a device associated with a highly privileged mode may have a race condition-free, reliable, and trustworthy way to determine if external entity is processing a command. In such an example, the device associated with the highly privileged mode can verify a status of the external entity and spin until it finishes processing a potential command initiated by an OS. When it stops, in some examples, the device associated with the highly privileged mode can set a Boolean flag to 1 because the external entity may be idle and not reading a flag and/or command buffer.

Some examples of the present disclosure can include a controller including a processing resource, a memory resource, and engines. The controller can be a combination of hardware and instructions for command source verification. The hardware, for example can include a processing resource and/or a memory resource (e.g., MRM, CRM, data store, etc.).

The processing resource, as used herein, can include a number of processors capable of executing instructions stored by a memory resource. The instructions (e.g., MRI) can include instructions stored on the memory resource and executable by the processing resource to implement a desired function (e.g., command source verification). The engine can include a combination of hardware and instructions to perform a number of functions described herein (e.g., command source verification). The instructions (e.g., software, firmware, etc.) can be downloaded and stored in a memory resource (e.g., MRM) as well as a hard-wired program (e.g., logic), among other possibilities.

In the foregoing detailed description of the present disclosure, reference is made to the accompanying drawings that form a part hereof, and in which is shown by way of illustration how examples of the disclosure can be practiced. These examples are described in sufficient detail to enable those of ordinary skill in the art to practice the examples of this disclosure, and it is to be understood that other examples can be utilized and that process, electrical, and/or structural changes can be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

What is claimed:

1. A device, comprising:
a first memory resource storing executable instructions;
a first processing resource to execute the instructions stored on the first memory resource to:
send a command to a second processing resource via a predefined path to a predefined location within the first memory resource, wherein a second memory resource stores instructions executable by the second processing resource to:
verify a source of the command is the first processing resource using a predefined protocol; and
execute the command in response to the source verification,
wherein the first processing resource and the second processing resource run in parallel to one another.

2. The device of claim 1, wherein the first memory resource is associated with a system management mode (SMM).

3. The device of claim 1, wherein the second processing resource is a secure processor.

4. The device of claim 1, wherein the instructions executable to verify a source of the command is the first processing resource include instructions executable to verify a security privilege level of the first memory resource.

5. The device of claim 1, wherein the first memory resource is associated with a highest privilege mode available on the device.

6. A system, comprising:
a shared memory resource storing executable instructions;
a first device, comprising a first processing resource to execute the instructions stored on the shared memory resource to send a command to a second device via a predefined path by:
   filling a predefined command buffer in the shared memory resource; and
   setting a flag located in the shared memory resource to a particular value; and
the second device communicatively coupled to the first device and comprising a second processing resource to execute the instructions stored on the shared memory resource to verify a source of the command by:
   determining whether the command buffer overlaps with the shared memory resource;
   determining whether the flag has the non-zero value in response to a determination the command buffer overlaps with the shared memory resource; and
   executing the command in response to a non-zero value determination.

7. The system of claim 6, wherein the shared memory resource is a memory resource associated with highly privileged code.

8. The system of claim 6, wherein the instructions executable to verify the source of the command further comprise instructions executable to verify the source of the command by exiting processing of the command in response to a determination that the command buffer overlaps with the shared memory resource, but is not a specified command buffer.

9. The system of claim 6, wherein the instructions executable to verify the source of the command further comprises instruction executable to verify the source of the command by exiting processing of the command in response to a determination that the flag does not have the particular value.

10. The system of claim 6, further comprising a basic input/output system (BIOS) comprising instructions stored on the shared memory resource and executable by the first processing resource to pass an address in the shared memory resource of the predefined command buffer to the second device prior to untrusted code being able to execute.

11. The system of claim 6, further comprising a BIOS including instructions stored on the shared memory resource and executable by the first processing resource to pass an address in the shared memory resource of the flag to the second device prior to untrusted code being able to execute.

12. The system of claim 6, wherein the particular value comprises a value that matches an identification of the command.

13. A method, comprising:
receiving a corrupt command from an unprivileged device;
receiving, via a predefined path, a privileged command at a predefined location within a first memory resource;
in response to receipt of the corrupt command and the privileged command, verifying a source of the corrupt command and a source of the privileged command;
exiting processing of the corrupt command in response to a failure to verify the source of the corrupt command; and
executing the privileged command in response to verification of the source of the privileged command based on the predefined path and predefined location.

14. The method of claim 13, wherein exiting processing includes refraining from reading and writing instructions to a buffer associated with the first and a second memory resources.

15. The method of claim 13, wherein receiving the corrupt command from the unprivileged device comprises receiving the corrupt command from a device associated with a lower security privilege mode than the source of the privileged command.

* * * * *